(12) United States Patent
Alexander, III et al.

(10) Patent No.: US 6,701,402 B1
(45) Date of Patent: Mar. 2, 2004

(54) SELECTIVELY OPERATING A HOST'S DEVICE CONTROLLER IN A FIRST MODE OR A SECOND MODE

(75) Inventors: Walter W. Alexander, III, Santa Clara, CA (US); Wesley H. Stelter, San Bruno, CA (US); Robert G. Campbell, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 483 days.

(21) Appl. No.: 09/820,727

(22) Filed: Mar. 30, 2001

(51) Int. Cl.[7] .............................................. G06F 13/14
(52) U.S. Cl. .......................... 710/305; 710/74; 710/36; 710/14
(58) Field of Search ........................ 710/62–74, 36–50, 710/200, 305, 8–19

(56) References Cited

U.S. PATENT DOCUMENTS 5,682,509 A * 10/1997 Kabenjian ................... 710/312
6,065,096 A * 5/2000 Day et al. ................... 711/114
6,108,724 A * 8/2000 Din ............................. 710/52
2002/0103913 A1 * 8/2002 Tawil et al. ................ 709/229
2003/0097509 A1 * 5/2003 Fry et al. .................... 710/305

* cited by examiner

Primary Examiner—Sumati Lefkowitz

(57) ABSTRACT

The present invention includes an integrated circuit that is operable to connect a redundant array of inexpensive disks (RAID) or other peripheral device to a disk controller, such as a small computer system interface (SCSI) controller in a host device. The integrated circuit provides the peripheral device with sole access to the disk controller when operating in a straight mode. In straight mode, the peripheral device may communicate with the disk controller through a PCI bus to perform operations, such as retrieving or writing data to the peripheral device. Also, when in straight mode, other controllers, including the host's CPU, may be prevented from using the disk controller to avoid data collisions, data loss and possible system failure. The integrated circuit may also function in standard mode, such that other controllers connected to the host may access the disk controller.

20 Claims, 2 Drawing Sheets

SELECTIVELY OPERATING A HOST'S DEVICE CONTROLLER IN A FIRST MODE OR A SECOND MODE

FIELD OF THE INVENTION

The present invention is generally related to connecting a plurality of peripherals to a bus in a computer. More particularly, the present invention is related to providing a peripheral with control of a disk controller in a computer through a bus.

BACKGROUND OF THE INVENTION

Servers and other devices providing services for a large number of clients generally need to store large amounts of data that may be accessed by clients. Often, storage space provided with servers and other similar devices (e.g., mainframes, workstations and the like) becomes inadequate. Accordingly, storage devices have been developed that can be connected to servers and other similar devices.

One such storage device includes a redundant array of inexpensive disks (RAID). A RAID typically includes one or more small computer system interface (SCSI) controllers for controlling input/output (I/O) operations for each of the RAID's drives and other peripherals connected to the server's bus. Conventionally, a server also includes at least one SCSI controller, for example, connected to the server motherboard, for controlling I/O operations for peripherals connected to the bus.

In order to minimize costs, ideally the RAID should utilize the SCSI controller located in the server, rather than providing SCSI controllers with the RAID. However, if the RAID were to utilize the SCSI controller in the server, the I/O processor for the RAID and the central processing unit (CPU) in the server would compete for control of the SCSI controller. For example, the CPU may attempt to communicate with the SCSI controller in the server to handle an I/O operation for a peripheral connected to the bus. The RAID may also attempt to communicate with the SCSI controller in the server to handle an I/O operation for the RAID. This may result in data collisions, data loss and/or system failure.

SUMMARY OF THE INVENTION

The present invention facilitates use of a preexisting controller in a host for a peripheral device connected to the host.

In one respect the present invention includes a circuit in a computer system. The computer system includes a host and a peripheral device connected to the host, and the host includes a device controller to control data operations for the peripheral device. The integrated circuit is operable to connect the device controller to the peripheral device via a bus in the host, such that the peripheral device is provided with sole access to the device controller.

The circuit includes a logic circuit operable to detect when the peripheral device is granted master access to the bus based on a first signal and to detect when the bus is idle based on a plurality of second signals. The logic circuit is further operable to connect the device controller to the bus when the peripheral device is granted master access to the bus and when the bus idle. The logic circuit is further operable to disconnect the device controller from the bus when master access is not granted to the peripheral device and/or when the bus is not idle.

The circuit is further operable to function in two modes. In a first mode (e.g., a straight mode) the peripheral device is provided with sole access to the device controller. In a second mode (e.g., a standard mode), other devices may gain access to the device controller.

In another respect the present invention includes a method of providing a peripheral device access to a device controller in a host. The method includes steps of (1) determining whether said peripheral device is granted master access to a bus in said host; (2) determining whether said bus is idle; and (3) providing said peripheral device with sole access to said device controller in response to said peripheral device being granted master access to said bus and said bus being idle.

The present invention provides a simple, inexpensive circuit that allows a peripheral device connected to a host to utilize the disk controller for the host. Therefore, additional costs are minimized by eliminating the need to provide another disk controller in the peripheral device. Those skilled in the art will appreciate these and other advantages and benefits of various embodiments of the invention upon reading the following detailed description of a preferred embodiment with reference to the below-listed drawings.

BRIEF DESCRIPTION OF THE DRAWINGS

The present invention is illustrated by way of example and not limitation in the accompanying figures in which like numeral references refer to like elements, and wherein.

DETAILED DESCRIPTION OF THE INVENTION

In the following detailed description, numerous specific details are set forth in order to provide a thorough understanding of the present invention. However, it will be apparent to one of ordinary skill in the art that these specific details need not be used to practice the present invention. In other instances, well known structures, interfaces, and processes have not been shown in detail in order not to unnecessarily obscure the present invention.

Figure 1:
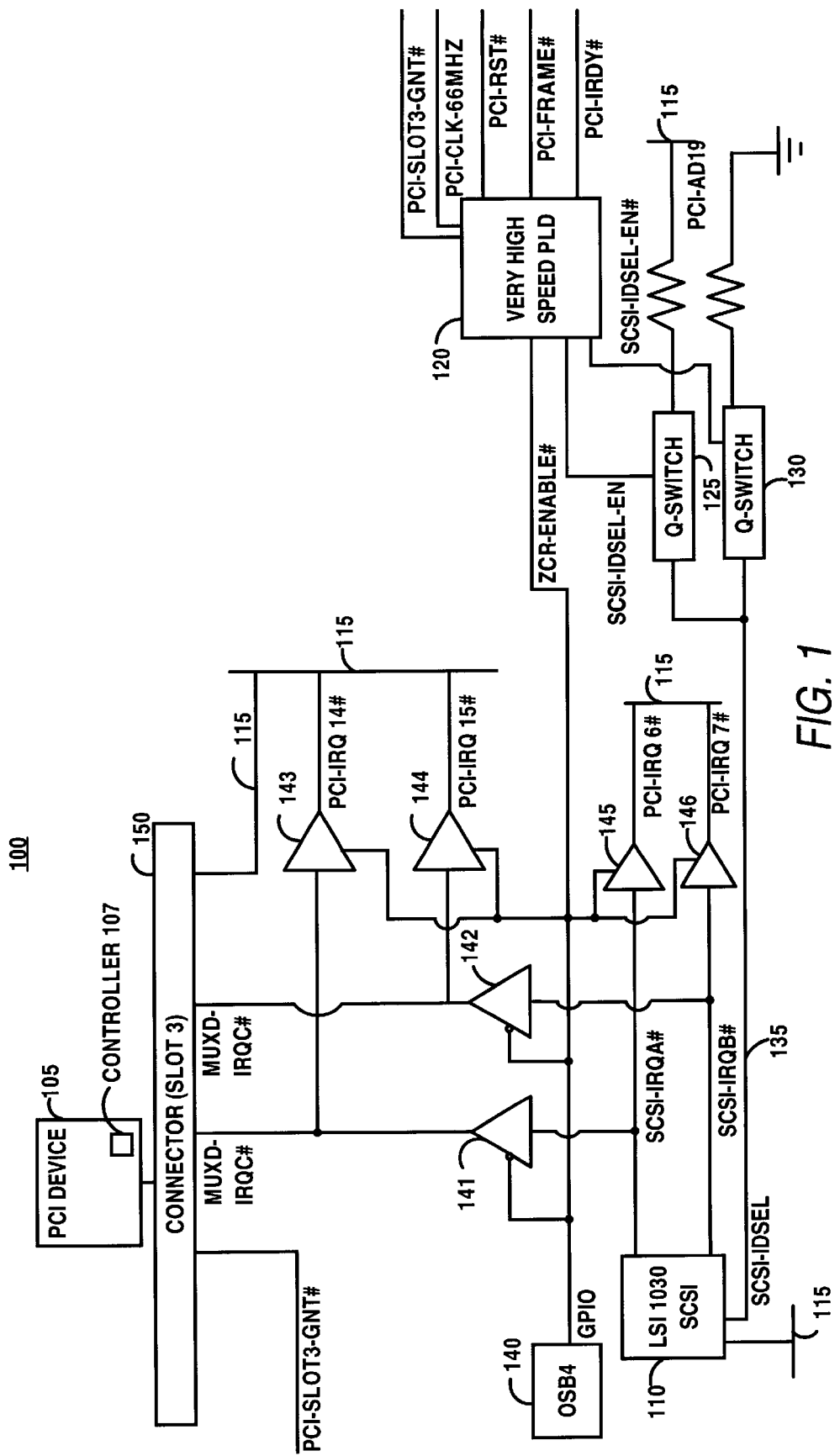
FIG. 1 shows a schematic diagram of an exemplary embodiment of a circuit employing the principles of the present invention.

FIG. 1 illustrates a circuit 100, such as an integrated circuit, in a host (e.g., server, work station, personal computer and the like) that allows a peripheral component interconnect (PCI) device 105 (e.g., a RAID or other conventional storage devices) to utilize a conventional disk controller 110 (e.g., an LSI 1030 SCSI controller) in the host device. Circuit 100 provides PCI device 105 (e.g., a RAID) with sole access to disk controller 110 for performing data operations, such as for retrieving or writing data to PCI device 105. Therefore, lost data or data collisions resulting from simultaneous control of disk controller 110 by multiple bus masters is prevented.

PCI device 105 is connected to the host through connector 150 (e.g., a 66 Mhz/64 bit PCI/zero-channel RAID connector). Connector 150 is shown as being in slot 3 in the host, however, the connector may be provided in other slots in the host. Also, other conventional connectors may be used to connect PCI device 105 to the host. In order for PCI device 105 to communicate with disk controller 110 through PCI bus 115, the PCI device controller 107 (e.g., a RAID I/O controller) should be master of PCI bus 115 for preempting other masters (e.g., a CPU in the host device, local area network (LAN) controller or other controllers with access to PCI bus 115) from simultaneously transmitting information on PCI bus 115. Typically, to be given master access to PCI bus 115, controller 107 should receive a grant from a bus arbitration circuit (not shown). Then, PCI bus 115 should be idle before controller 107 can communicate with disk controller 110 on PCI bus 115. When controller 107 is given master access to PCI bus 115, controller 107 is the only master communicating with disk controller 110 (i.e., controller 107 is provided with sole access to disk controller 110). Accordingly, other masters connected to PCI bus 115 may not communicate with disk controller 110 until controller 107 relinquishes master access to PCI bus 115.

Circuit 100 includes a programmable logic device (PLD) 120 and Q-Switches 125 and 130 for connecting and disconnecting disk controller 110 to PCI bus 115. PLD 120 detects when controller 107 is granted master access to PCI bus 115. Then, when PCI bus 115 is idle, PLD 120 closes Q-switch 125 and opens Q-switch 130, which results in an ID select line (IDSEL) 135 for disk controller 110 becoming connected to an Address/Data bit (e.g., PCI-AD19) on PCI bus 115.

When IDSEL 135 is connected to PCI bus 115, controller 107 (i.e., the present master of PCI bus 115) may perform a master cycle, such as a configuration cycle, when PCI bus 115 is idle and controller 107 is granted master access to PCI bus 115. The configuration cycle may be performed according to known PCI industry standards. When controller 107 performs the configuration cycle, controller 107 detects disk controller 110 connected to PCI bus 115, because IDSEL is connected to PCI bus 115 via Q-switch 125. Thereafter, controller 107 may perform another master cycle to perform a data operation, such as a read or write. For example, for a read operation, controller 107 communicates with disk controller 110 via PCI bus 115 to retrieve requested data from a disk in the RAID. Controller 107 may then send the requested data to the host's CPU when the CPU becomes master of PCI bus 115.

PLD 120 is also operable to disconnect IDSEL 135 from PCI bus 115. When controller 107 relinquishes master access to PCI bus 115 and at the completion of a master cycle, PLD 120 opens Q-switch 125 and closes Q-switch 130. This results in IDSEL 135 becoming disconnected from PCI bus 120 and being pulled to ground. When IDSEL 135 is disconnected from PCI bus 115, another master may gain master access to PCI bus 115 for performing transactions on PCI bus 115. However, because IDSEL 135 is disconnected from PCI bus 115, other devices that may become master of PCI bus 115 cannot detect disk controller 110 when they perform a configuration cycle. Accordingly, other masters are prevented from communicating with disk controller 110 and controller 107 maintains sole access with disk controller 110.

A PCI device enable/disable signal (i.e., ZCR-ENABLE#) that is controlled, for example, by the host's system basic I/O system (BIOS) allows disk controller 110 to function in different modes. For example, when ZCR-ENABLE# is not asserted (i.e., ZCR-ENABLE# is high), disk controller 110 operates in standard mode and functions as a conventional disk controller. In standard mode, disk controller 110 may control access to a local storage device, such as a hard disk drive, CD-ROM, floppy disk drive and the like. Also, in standard mode a PCI device, other than a RAID, may be connected to connector 150 and use interrupts (e.g., PCI-IRQ14# and PCI-IRQ15) for requesting use of PCI bus 115 from the host's CPU.

When ZCR-ENABLE# is asserted (i.e., ZCR-ENABLE# is low), disk controller 110 operates in a straight mode.

Then, as discussed above, controller 107 may be given master access to PCI bus 115, therefore allowing controller 107 to be the only master operable to communicate with disk controller 110. ZCR-ENABLE# and other signals, described in detail below, are asserted as a low signal, as designated by the #. Circuit 100 is generally designed, such that these signals are asserted low when circuit 100 is operating in straight mode. However, it will be apparent to one of ordinary skill in the art that circuit 100 may readily be designed, such that one or more of these signals are asserted high when circuit 100 is operating in straight mode.

ZCR-ENABLE# may be transmitted from a southbridge 140 (e.g., Open Southbridge Version 4 (OSB4), manufactured by SERVER WORKS). Southbridge 140 includes a general purpose input/output (GPIO) on which ZCR-ENABLE# is output. Southbridge 140 may be controlled by the system BIOS to assert or not assert ZCR-ENABLE#. For example, the system BIOS may include a manual setting for selecting straight mode or standard mode. Southbridge 140 may detect the setting and accordingly assert or not assert ZCR-ENABLE#.

Typically, a PCI device uses an interrupt for requesting the host's CPU to perform a desired function. PCI device 105 and disk controller 110 are each provided with two interrupts controlled by gates 141–146 and ZCR-ENABLE# for allowing circuit 100 to function in the different modes.

When ZCR-ENABLE# is asserted (i.e., circuit 100 is functioning in straight mode and PCI device 107 is provided with sole access to disk controller 110), gates 145 and 146 prevent two interrupts (e.g., PCI-IRQ6# and PCI-IRQ7#) for disk controller 110 from being asserted. Instead, the interrupts (e.g., MUXD-IRQC#) are transmitted to PCI device 105 via gates 141 and 142. This informs controller 107 that disk controller 110 requires service, such as requesting communication with controller 107 for performing a data operation. This further prevents the host CPU (not shown) from accessing the disk controller 110. Also, gates 143 and 144 prevent two interrupts (e.g., PCI-IRQ14# and PCI-IRQ15#), which may be used when circuit 100 operates in standard mode, from being asserted.

When circuit 100 is operating in standard mode, ZCR-ENABLE# is not asserted (e.g., ZCR-ENABLE# is high). Then, two interrupts (e.g., PCI-IRQ14# and PCI-IRQ15#) for a device connected to connector 150, such as a LAN controller or other PCI device, may be transmitted to PCI bus 115 via gates 143 and 144. For example, if a LAN controller is connected to the host via connector 150, the LAN controller may utilize PCI-IRQ14# and PCI-IRQ15# for requesting use of PCI bus 115 from the host's CPU. Also, in standard mode, gates 141–142 prevent the interrupts (e.g., PCI-IRQ6# and PCI-IRQ7#) for disk controller 110 from being transmitted to connector 150, and gates 145–146 allow those interrupts to be transmitted to PCI bus 115.

The detailed operation of PLD 120 for controlling disk controller 110 in standard mode and straight mode will now be described. When circuit 100 is in straight mode, southbridge 140 asserts ZCR-ENABLE#. For example, ZCR-ENABLE# is asserted low, and it is transmitted to PLD 120.

PCI-SLOT3-GNT# may also be asserted by an arbitration circuit (not shown) in the host when controller 107 is granted master access to PCI bus 115 by the arbitration circuit.

For example, the host includes a conventional arbitration circuit for controlling master access to PCI bus 115. When controller 107 is granted master access, PCI-SLOT3-GNT# is asserted and transmitted to controller 107 and PLD 120 for indicating that master access is granted to controller 107.

PLD 120 also receives multiple signals for determining when PCI bus 115 is idle. PLD 120 receives a system reset signal PCI-RST#. When PCI-RST# is asserted, the host system is reset. PLD 120 will not close Q-switch 125 until the system is reset, which typically happens when the host system is booted. PLD 120 also receives PCI-FRAME# and PCI-IRDY# signals. When these signals are asserted and after the system is reset, PLD 120 determines that PCI bus 115 is idle. PCI-FRAME# and PCI-IRDY# are conventionally used for determining when a PCI bus is idle.

Q-switches 125 and 130 are driven by a high signal (i.e., Q-switches 125 and 130 close when the y receive a high signal and open when they receive a low signal). Therefore, when PCI bus 115 is idle and controller 107 is granted master access to PCI bus 115, then on a clock pulse (e.g., when PCI-CLK is asserted), PLD 120 drives SCSI-IDSEL-EN# low and drives SCSI-IDSEL-EN high. As a result Q-switch 125 closes and Q-switch 130 opens. Then, disk controller 110 is connected to PCI bus 115, and controller 107 is provided with sole access to disk controller 110. When controller 107 loses master access to PCI bus 115, then PLD 120 de-asserts SCSI-IDSEL-EN (i.e., PLD 120 drives SCI-IDSEL-EN low) and de-asserts SCSI-IDSEL-EN# (i.e., PLD 120 drives SCSI-IDSEL-EN# high). Then, Q-switch 125 opens and Q-switch 130 closes, and IDSEL 135 and disk controller 110 are disconnected from the PCI bus.

When circuit 100 is in standard mode, ZCR-ENABLE# is not asserted. Accordingly, in standard mode PLD 120 continually asserts SCSI-IDSEL-EN (i.e., SCSI-IDSEL-EN is high) and SCSI-IDSEL-EN# (i.e., SCSI-IDSEL-EN# is low). As a result, Q-switch 125 is continually closed and Q-switch 130 is continually open in standard mode, and IDSEL 135 and disk controller 110 are connected to PCI bus 115.

Figure 2:
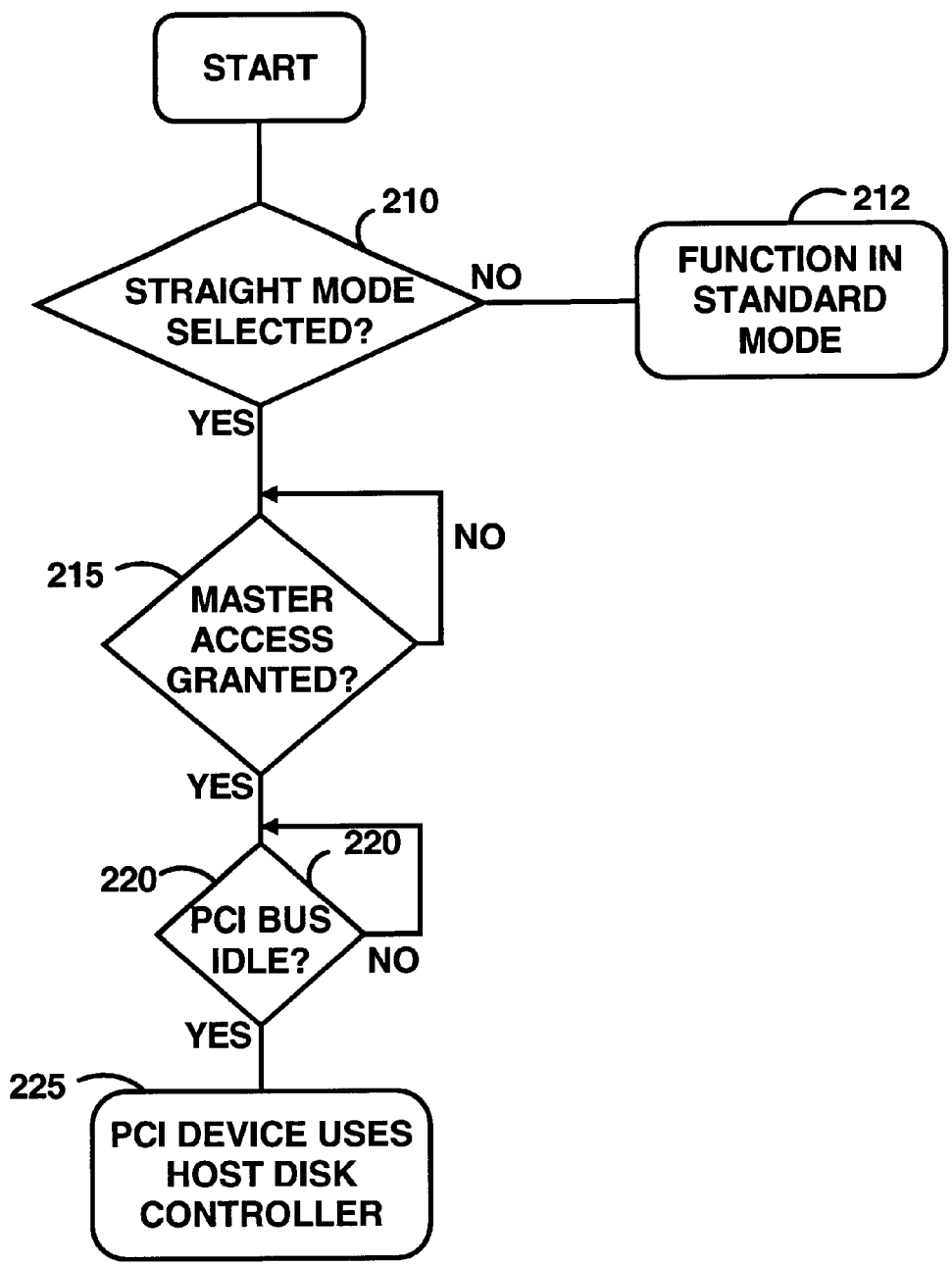
FIG. 2 illustrates a method for controlling a system disk controller, according to the principles of the present invention.

FIG. 2 illustrates an exemplary flow diagram 200 including steps, which may be performed by circuit 100. In step 210, the mode is selected for circuit 100. For example, circuit 100 detects whether the straight mode is selected (i.e., whether ZCR-ENABLE# is asserted). If the straight mode is selected in step 210, PLD 120 determines whether PCI device 105 is granted master access to PCI bus 115 (step 215). If the straight mode is not selected in step 210, circuit 100 functions in standard mode (step 212) and the PCI device connected to connector 150 is not provided with sole access to disk controller 110.

If master access is not granted, PLD 120 waits for master access to be granted. If master access was granted in step 215, PLD 120 determines whether PCI bus 115 is idle (step 220). In step 220, if PCI bus 115 is not idle, PLD 120 waits for PCI bus 115 to become idle. If PCI bus 115 was idle in step 220, PLD 120 closes Q-switch 125 and opens Q-switch 130. Then, disk controller 110 is connected to PCI bus 115, and PCI device 107 (e.g., a RAID) may use disk controller 110 in the host to perform transactions on PCI bus 115 (step 225). It will be apparent to one of ordinary skill in the art that steps 215 and 220 may performed in any order or simultaneously. For example, when in straight mode, PCI device 105 is provided with sole access to disk controller 110 (step 225) if master access is granted in step 215 and PCI bus 115 is idle in step 220.

The present invention has generally been described with respect to PCI device 105 being a RAID. The present invention, however, may be applied to any controller that may need to be selectively accessed. For example, circuit 100 may be connected to a LAN controller. When circuit 100 operates in straight mode, the LAN controller and the network connected thereto may be accessed, for example by an I/O controller or a CPU. When circuit 100 operates in standard mode, the network may not be visible to other devices. Also, circuit 100 may function with peripheral devices, other than a RAID, such as other PCI devices, other storage devices and the like.

While this invention has been described in conjunction with the specific embodiments thereof, it is evident that many alternatives, modifications and variations will be apparent to those skilled in the art. There are changes that may be made without departing from the spirit and scope of the invention.

What is claimed is:

1. An integrated circuit in a computer system, said computer system including a host and a peripheral device connected to said host, and said host including a device controller to control data operations for said peripheral device, wherein said integrated circuit is operable to connect said device controller to said peripheral device via a bus in said host, such that said peripheral device is provided with sole access to said device controller; and a first switch and a second switch, wherein said integrated circuit is operable to close said first switch and open said second switch to provide said peripheral device with sole access to said device controller.

2. The integrated circuit of claim 1, wherein said integrated circuit is operable to receive a first signal to determine if said peripheral device is granted master access and is operable to receive a plurality of second signals to determine if said bus is idle.

3. The integrated circuit of claim 2, further comprising a logic circuit controlling said first and second switches and being operable to detect when said peripheral device is granted master access based on said first signal and to detect when said bus is idle based on said plurality of second signals.

4. The integrated circuit of claim 1, further being operable to function in a first mode, whereby said integrated circuit is operable to provide said peripheral device with sole access to said device controller when functioning in said first mode, and to function in a second mode, whereby said integrated circuit is operable to provide other controllers with access to said device controller when functioning in said second mode.

5. The integrated circuit of claim 4, wherein said device controller is provided with at least two device controller interrupts and said peripheral device is provided with at least two peripheral device interrupts.

6. The integrated circuit of claim 5, wherein said at least two device controller interrupts are connected to said peripheral device and said at least two peripheral device interrupts are disabled when said integrated circuit functions in said first mode.

7. The integrated circuit of claim 6, wherein said device controller asserts said at least two device controller interrupts to request communication with said peripheral device when said integrated circuit functions in said first mode.

8. The integrated circuit of claim 5, wherein said at least two peripheral device interrupts are connected to said bus and said at least two device controller interrupts are disabled when said integrated circuit functions in said second mode.

9. The integrated circuit of claim 8, wherein said peripheral device asserts said at least two peripheral device interrupts to request use of the bus.

10. The integrated circuit of claim 1, wherein said device controller is a disk controller.

11. The integrated circuit of claim 10, wherein said peripheral device is a RAID.

12. The integrated circuit of claim 1, wherein said bus is a peripheral component interconnect bus, and said peripheral device is a peripheral component interconnect device.

13. A method of providing a peripheral device access to a device controller in a host, the method comprising steps of:

selecting between a first and second mode;

in response to a selection of said first mode, via a bus such that a device other than said peripheral device cannot detect the device controller when granted access to the bus; and providing the device, other than said peripheral device, with access to said device controller in response to a selection of said second mode.

14. The method of claim 13, wherein said device controller is a disk controller.

15. A logic circuit operable to provide a peripheral device connected to a host with sole access to a device controller in said host to control data operations for said peripheral device in a first mode; and the logic circuit being operable to provide at least one other peripheral device with access to the device controller in a second mode such that the at least one other peripheral device is operable to communicate with the device controller in the second mode;

wherein in the first mode the at least one other peripheral device is operable to be connected to a bus connecting the peripheral device and the at least one other peripheral device to the device controller but the logic circuit allows only said peripheral device to communicate with the device controller via the bus.

16. The logic circuit of claim 15 further being operable to provide said peripheral device with said sole access to said device controller in response to said logic circuit detecting said peripheral device being granted master access to said bus and detecting said bus being idle.

17. The logic circuit of claim 16, further being operable to connect said device controller to said bus to provide communication between said device controller and said peripheral device via said bus in response to said peripheral device being granted master access to said bus and detecting said bus being idle.

18. The logic circuit of claim 17, wherein said logic circuit includes a programmable logic circuit, said peripheral device includes a RAID and said device controller includes a disk controller.

19. An integrated circuit selectively providing one of a first peripheral device and a second peripheral device access to a device controller means, the device controller means controlling access to the first peripheral device and the second peripheral device, wherein the apparatus comprises:

means for providing the first peripheral device with sole access to the device controller in a first mode via a bus such that the second peripheral device cannot detect the device controller when granted access to the bus;

means for providing the second peripheral device with access to the device controller means when the integrated circuit is in a second mode; and means for selecting between the first mode and the second mode.

20. The integrated circuit of claim 19, further comprising:

means for controlling a first switch means and a second switch means for granting the first peripheral device access to the device controller means in the first mode and for granting the second peripheral device access to the device controller means in the second mode.

* * * * *